(12) United States Patent
Autenrieth et al.

(10) Patent No.: US 6,432,378 B1
(45) Date of Patent: *Aug. 13, 2002

(54) PROCESS FOR OPERATING A METHANOL REFORMING SYSTEM

(75) Inventors: Rainer Autenrieth, Erbach; Andreas Christen, Kehr; Martin Schuessler, Ulm; Detlef zur Megede, Bubesheim, all of (DE)

(73) Assignee: Xcellsis GmbH, Kirchheim/Teck-Nabern (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 23 days.

(21) Appl. No.: 09/094,672

(22) Filed: Jun. 15, 1998

(30) Foreign Application Priority Data

Jun. 13, 1997 (DE) .......................................... 197 25 007

(51) Int. Cl.⁷ ................................................ C01B 3/16
(52) U.S. Cl. ..................... 423/648.1; 429/19; 48/179 R
(58) Field of Search .................. 48/61, 127.9, 197 FM, 48/197 R, 199, 199 R, 203; 423/246, 248, 648.1, 650, 551; 502/50, 52; 479/19

(56) References Cited

U.S. PATENT DOCUMENTS

| 3,515,514 A | * | 6/1970 | Holmes et al. | 423/654 |
| 4,855,267 A | * | 8/1989 | Cheng | 502/50 |
| 5,075,268 A | * | 12/1991 | Kurashige et al. | 502/52 |
| 5,658,681 A | * | 8/1997 | Sato et al. | 429/13 |
| 5,772,707 A | * | 6/1998 | Wiesheu et al. | 48/197 R |

FOREIGN PATENT DOCUMENTS

| DE | 1 246 688 | 8/1967 |
| DE | 33 14 131 A1 | 10/1984 |
| DE | 35 31 757 A1 | 3/1986 |
| DE | 195 34 433 C1 | 10/1996 |
| EP | 0 201 070 A1 | 11/1986 |
| JP | 3-247501 A | * 11/1991 |

OTHER PUBLICATIONS

Patent Abstracts of Japan, JP–A 580 72 666, Murakami Yasuhiro, Apr. 30, 1983.
Yoshiaki Nakazaki et al., "Highly Selective Decomposition of Methanol to Syngas on Nickel–Based Composite Catalysts Using an Artificial Intelligence Control Reactor System," Ind. Eng. Chem. Res., 1989, vol. 28, No. 9, pp. 1285–1288.
Patent Abstracts of Japan, C–906, Jan. 31, 1992, vol. 16/No. 40, JP 3–247501 (A), Nov. 5, 1991, Masaaki Yanagi.
Patent Abstracts of Japan, C–1002, Nov.4, 1992, vol. 16/No. 533, JP 4–200640 (A), Jul. 21, 1992, Michihiko Kurashige.
Patent Abstracts of Japan, JP 04141234 A, May 14, 1992, Moriga Takuya et al.
Patent Abstracts of Japan, JP 63310703 A, Dec. 19, 1988, Seya Akitoshi.
Patent Abstracts of Japan, JP 63315501 A, Dec. 23, 1988, Yoshioka Hiroshi et al.

* cited by examiner

Primary Examiner—Jerry D. Johnson
Assistant Examiner—Frederick Varcoe
(74) Attorney, Agent, or Firm—Crowell & Moring LLP

(57) ABSTRACT

A process for operating a methanol reforming system in which, in the reforming reaction operation, methanol is reformed in a methanol reforming reactor using a methanol reforming catalyst. The reforming reaction operation is interrupted periodically for catalyst reactivation phases during which the methanol reforming catalyst whose catalytic activity decreases in the reforming reaction operation is treated in an activity-regenerating manner. The process may be used in fuel-cell-driven motor vehicles for generating hydrogen for the fuel cells from methanol carried along in the liquid state.

7 Claims, No Drawings

PROCESS FOR OPERATING A METHANOL REFORMING SYSTEM

BACKGROUND AND SUNDRY OF THE INVENTION

This application claims the priority of German Patent Document No. 197 25 007.6, filed on Jun. 13, 1997, the disclosure of which is expressly incorporated by reference herein.

The invention relates to a process for operating a methanol reforming system using a methanol reforming catalyst in which the reforming reaction operation is interrupted periodically for catalyst reactivation phases.

Processes for the catalytic reforming of methanol are known and are used, for example, for generating hydrogen for the fuel cells of a fuel-cell-operated motor vehicle by means of water vapor reforming of methanol carried along in the liquid state. A catalytically active Cu/ZnO material on an aluminum oxide carrier, for example, is suitable to be used as the catalyst material. Additional usable catalyst compositions are described, for example, in German Published Patent Application DE 35 31 757 A1 and European Published Patent Application EP 0 201 070 A1. The catalyst material is usually charged as bulk pellets into the reforming reaction space of the concerned methanol reforming reactor.

It is a known characteristic of current methanol reforming catalysts that they exhibit a decrease of their specific activity during the reforming reaction operation. This is particularly true during an operation under a high load which is desired in mobile applications. For this field of application, a particularly compact construction of the reactor is desired for space and weight reasons. The reactor is then operated at a correspondingly high load for achieving the required conversion output.

Taking into account the mobility and service expectations of motor vehicle users, a more frequent exchange of the catalyst material is difficult to accept.

Various processes have been suggested for maintaining a high catalytic activity or for achieving a high service life of the methanol reforming catalyst. Thus, a special recipe of various metal oxides is indicated in Japanese Published Patent Application JP 4-141234 (A) for obtaining a catalyst with a long service life as well as a high activity and selectivity.

In Japanese Published Patent Application JP 63-310703 (A), the catalyst material is subjected to a reduction reaction in the reforming reaction space of a methanol reforming reactor before the start of the reforming reaction operation. The reduction reaction results in a decrease in the volume of the catalyst. A pressure-spring-loaded movable cover plate holds the catalyst material, charged into the reaction space as bulk pellets, compressed as a dense packing. The reduction reaction is a process required for the operation of a Cu catalyst. The decrease in volume occurring in this case is clearly lower than the decrease in volume that occurs during the normal reforming operation.

Published Japanese Patent Application JP 63-315501 (A) suggests the placing of an air chamber between a burner and a reforming reaction space. By way of the air chamber, air can be supplied in a controlled manner in order to hold the catalyst temperature at a defined value.

In a process disclosed in German Published Patent Application DE 33 14 131 A1, for extending the service life of the methanol reforming catalyst, the methanol is freed of compounds of chlorine which may be contained therein before the methanol is brought in contact with the catalyst.

A process of the initially mentioned type is indicated in German Patent Document DE 1 246 688. According to this process, the reforming reaction operation is periodically interrupted for catalyst reactivation phases for the purpose of an activity-regenerating treatment of the catalyst. The activity-regenerating treatment comprises subjecting the catalyst to an oxygen-containing gas flow, such as air, at a raised temperature of preferably 150° C. to 450° C. After this regenerating of the catalyst, the catalyst may be subjected, as required, to a hydrogen-containing gas at a raised temperature in order to reactivate it before the reforming reaction is started again. An activity-regenerating treatment of a methanol reforming catalyst by subjecting it to an oxygen-containing gas flow is also disclosed in Japanese Published Patent Application JP 4-200640 (A).

From German Published Patent Application DE 33 14 131 A1, it is known to raise the reaction temperature successively over the service life of a methanol reforming catalyst in order to compensate the decreasing catalyst activity.

In Japanese Published Patent Application JP 3-247501 (A), a process is described for the operation of a methanol reforming reactor which, when the reforming reactor is switched off, comprises a rinsing of the reformation catalyst bed with reformed gas under a high pressure. This rinsing prevents a weakening of the effect of the catalyst by methanol condensing on the catalyst bed. A rinsing with nitrogen gas is mentioned as a conventional alternative to this approach.

The present invention is based on the technical problem of providing a process of the initially mentioned type by means of which a methanol reforming system can be operated at comparatively low expenditures for longer operating periods with a reforming conversion output that does not noticeably decrease.

The present invention solves this problem by providing the following process for operating a methanol reforming system having catalyst reactivation phases. In this process, the reforming reaction operation is periodically interrupted for catalyst reactivation phases during which the methanol reforming catalyst, whose catalytic activity decreases during the reforming to reaction operation, is treated in an activity-regenerating manner. By means of the interposition of such reactivation phases, the original activity of the catalyst can be restored at least partially which, on the whole, permits longer operating periods of the system without a noticeably decreasing reformation conversion output and without the necessity of exchanging the catalyst. When the system is used in motor vehicles, the reactivation phases can be integrated in the normal driving operation.

According to a first embodiment, the catalyst reactivation phases comprise a reformation reaction operation wherein, in comparison with the remaining reformation reaction operation, the load is reduced and/or the temperature is higher. In another embodiment, a gas purification step follows the reactor and is also carried out during these catalyst reactivation phases. The gas purification step has an increased output with respect to the CO-conversion or CO-separation, which is higher than in the phases of the normal reformation reaction operation. As a result, a CO-fraction in the reformate gas flow, which may be higher during the reactivation phases, can be compensated so that no higher CO-fraction occurs during the reactivation phases at the outlet side of the gas purification step than in the normal reformation reaction operation.

In the case of a second embodiment, the reactor containing the methanol reforming catalyst is rinsed with inert gas for the activity-regenerating catalyst treatment and in the process is therefore operated without load. This was found to be a suitable method for the simple, at least partial restoring of the initial catalyst activity.

According to another embodiment of the present invention, a process for methanol reforming systems in motor vehicles is provided. In this process, the catalyst reactivation phases are triggered by a driver's demand or automatically by means of occurring vehicle stoppage phases. Thus, it is possible to integrate the catalyst reactivation phases in the normal driving operation without the requirement of interrupting the driving operation of the vehicle specifically for this purpose.

Also representing numerous other possible implementations of the present invention, a methanol reforming system arranged in a fuel-cell-operated motor vehicle is an embodiment by means of which the hydrogen required for the fuel cells is generated by means of the water vapor reforming of methanol carried along in a liquid state. In the reforming reaction space of the corresponding reforming reactor, a suitable methanol reforming catalyst is situated, for example, a $Cu/ZnO/Al_2O_3$-catalyst material in the form of bulk pellets. The reactor is followed by a gas purification stage in the form of a CO-conversion step, specifically a CO-oxidation step, by means of which the CO fraction in the high-hydrogen reformate gas emerging from the reactor is reduced to a low value, for example, lower than approximately 50 ppm, sufficient for the subsequent use in the fuel cells. As an alternative, a CO-separation step can be used as the gas purification step. Such methanol reforming systems are known in various types and therefore require no further explanation and illustration in drawings.

In the normal reforming reaction operation, the system generates the desired quantity of high-hydrogen reformate gas with a sufficiently low CO-content. In this case, the system is driven in the reforming reaction operation predominantly at maximal load because, for the purpose of saving space and weight, the system is constructed as compact as possible for the existing output demand. Specifically, also because of this method of operation at maximal or approximately maximal load (i.e., full load), a decrease of the specific catalytic activity of the methanol reforming catalyst will occur as the operating time increases. In order to ensure a comparatively long operating period of the system with a high conversion output without an exchange of the catalyst, the reforming reaction operation is periodically interrupted for catalyst reactivation phases during which the methanol reforming catalyst is treated in an activity-regenerating manner in order to restore its initial activity at least partially. Different approaches are conceivable for this activity-regenerating treatment.

A first method comprises operating the reforming system during the catalyst reactivation phases at a load that is lower than that of the reforming reaction operation; i.e., in the tis partial-load range rather than in the full load range. Typically the load selected for the reactivation phases amounts to between 0% and approximately 50% of the maximally possible load. The lower the load is set in the catalyst reactivation phases, the higher the activity-regenerating effect under otherwise identical conditions. Preferably, in addition to reducing the load, for the carrying-out of the catalyst reactivation phases, the temperature in the reactor and therefore of the catalyst material is raised. Typically, the temperature is raised by approximately 10° C. to 50° C. with respect to the temperature during the reforming reaction operation which is normally in the range of 200° C. and above. The higher the temperature increase selected for the catalyst reactivation phases while the conditions are otherwise identical, the higher the activity-regenerating effect. According to the application, instead of this combined reduction of the load and increase of the temperature, it is also conceivable to only raise the temperature for the transition from the reforming reaction operation to the catalyst reactivation phase.

As an accompanying measure, during the catalyst reactivation to phases, the gas purification step is preferably operated with a higher efficiency with respect to the CO-conversion or CO-separation. A CO-content in the reformate gas on the output side of the reactor, which may be increased during the reactivation phases in comparison to the normal reforming reaction operation because the temperature was raised, can be reduced in this manner. For example, when a CO-oxidation step is used as the gas purification step, the so-called air lambda value during the catalyst reactivation phases can be increased with respect to the reforming reaction operation. This air lambda value determines the amount of oxygen that is supplied to the reformate gas flow for the oxidation of the carbon monoxide contained in the latter, a lambda value of one representing the stoichiometric quantitative relationship. For the reforming reaction operation, a lambda value is typically selected which is slightly higher than one. The increased air lambda value during the catalyst reactivation phases therefore results in the setting of an increased $O_2$ excess in the CO-oxidation step, enabling this CO-oxidation step to reduce the CO-fraction in the reformate gas flow during the catalyst reactivation phases to the same low value as in the reforming reaction operation.

A second method of the activity-regenerating treatment of the methanol reforming catalyst comprises rinsing the reactor and thus the catalyst material contained in it with an inert gas during the catalyst reactivation phases, for example, with a nitrogen gas flow or an argon gas flow. The other process conditions can be selected in a respective suitable manner adapted to the concerned catalyst material and must then be maintained in the respective catalyst reactivation phases. It was found that also by means of such a rinsing with inert gas, the initial catalyst activity is at least partially restored.

For the triggering of a respective catalyst reactivation phase for the system situated in the vehicle, several variants are available. On the one hand, the possibility of a driver-demanded triggering can be provided, for example, by way of a corresponding operating push button. The motor vehicle user can then, for example, in each case, after the parking of the vehicle, trigger a catalyst reactivation phase by actuating the operating push button. In addition to or as an alternative to this measure, an automatic triggering of the catalyst reactivation phases can be provided, for example, always when vehicle stoppage phases occur. Vehicle stoppage phases occur when the vehicle is stopped for a definable time period, for example, because of a stop in front of a traffic light or because of a traffic jam. Detecting devices, which are provided on the vehicle side for this purpose, automatically detect the occurrence of such vehicle stoppage times, after which the detecting devices trigger the respective catalyst reactivation phase for the methanol reforming system. As required, the automatic as well as the driver-demanded triggering of catalyst reactivation phases may be implemented. In each case, it is possible to integrate the catalyst reactivation phases in the current driving operation without having to interrupt it for this purpose.

It is understood that the reactivation phases must be carried out only until the initial catalyst activity has been largely restored or there is at least no longer any significant activity increase. However, the catalyst reactivation phases may be terminated prematurely if they are caused by the driver-controlled driving operation; that is, when providing the momentarily required hydrogen quantity for the fuel cells, the methanol reforming system must be driven in the full-load range at the optimal methanol reforming temperature and thus in the reforming reaction operation.

The above description of an advantageous process embodiment shows that, by means of the process according to the present invention, a methanol reforming system can be operated for longer operating periods with an essentially constantly high catalyst activity and thus reforming conversion output, even if the system is frequently driven in the full-load range. A more frequent exchange of the catalyst material in the reactor is not required because of the activity-regenerating treatments of the methanol reforming catalyst during the catalyst reactivation phases. If the system is used in a motor vehicle, these reactivation phases can be carried out without disturbing the current driving operation of the vehicle. This meets the mobility and service expectations which motor vehicle users normally have, which avoids respective acceptance problems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for operating a methanol reforming system, comprising:

alternately operating said system in a normal water vapor reforming reaction mode and a catalyst reactivation mode, wherein during said normal water vapor reforming reaction mode, methanol is catalytically reformed in a reactor containing a catalyst whose catalytic activity decreases during said water vapor reforming; and during said catalytic reactivation mode, said catalyst is subjected one or more times to a reactivating treatment to restore at least partially the activity of the catalyst, wherein said reactivating treatment consists of increasing a temperature of the reactor and reducing a load of the reactor as compared to its load in the normal water vapor methanol reforming mode while maintaining a catalytic reforming reaction in the catalyst reactivation mode with said reduced load and increased temperature.

2. The process according to claim 1, wherein said reduced load is greater than 0% to about 50% of a maximum possible load.

3. The process according to claim 1, wherein said increased temperature is about 10° C. to 50° C. higher than the temperature of said catalytically reforming.

4. The process according to claim 1, further comprising purifying a reformate gas from the reactor during the catalyst reactivation mode in a gas purification stage, thereby reducing the carbon monoxide fraction in the reformate gas.

5. The process according to claim 1, wherein said reactor is in a vehicle and said catalyst reactivation mode is started by a driver of the vehicle or automatically occurs at a predetermined stopped phase of the vehicle.

6. A process according to claim 1, wherein said catalyst reactivation mode does not disturb a current driving operation of a vehicle comprising said methanol reforming system.

7. A process for operating a methanol reforming system, consisting of:

alternately operating said system in a water vapor reforming reaction mode and a catalyst reactivation mode, wherein during said water vapor reforming reaction mode, methanol is catalytically reformed in a reactor containing a catalyst whose catalytic activity decreases during said water vapor reforming; and during said catalytic reactivation mode, said catalyst is subjected one or more times to a reactivating treatment to restore at least partially the activity of the catalyst, wherein said reactivating treatment consists of increasing a temperature of the reactor and reducing a load of the reactor as compared to its load in the normal water vapor methanol reforming mode while maintaining a catalytic reforming reaction in the catalyst reactivation mode with said reduced load and increased temperature.

* * * * *